US011870210B2

United States Patent
Gan et al.

(10) Patent No.: US 11,870,210 B2
(45) Date of Patent: Jan. 9, 2024

(54) TRANSVERSE MODE SWITCHABLE ALL-FIBER HIGH-ORDER MODE BRILLOUIN LASER

(71) Applicant: South China University of Technology, Guangzhou (CN)

(72) Inventors: Jiulin Gan, Guangzhou (CN); Xiaobo Heng, Guangzhou (CN); Zhongmin Yang, Guangzhou (CN); Zhishen Zhang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 617 days.

(21) Appl. No.: 15/734,648

(22) PCT Filed: Oct. 16, 2018

(86) PCT No.: PCT/CN2018/110443
§ 371 (c)(1),
(2) Date: Dec. 3, 2020

(87) PCT Pub. No.: WO2019/233012
PCT Pub. Date: Dec. 12, 2019

(65) Prior Publication Data
US 2021/0234330 A1  Jul. 29, 2021

(30) Foreign Application Priority Data
Jun. 5, 2018 (CN) .......................... 201810569311.8

(51) Int. Cl.
*H01S 3/30* (2006.01)
*H01S 3/067* (2006.01)
(Continued)

(52) U.S. Cl.
CPC .......... *H01S 3/302* (2013.01); *H01S 3/06754* (2013.01); *H01S 3/06791* (2013.01);
(Continued)

(58) Field of Classification Search
CPC .. H01S 3/302; H01S 3/06754; H01S 3/06791; H01S 3/0804; H01S 3/094003;
(Continued)

(56) References Cited

U.S. PATENT DOCUMENTS 6,424,664 B1 * 7/2002 Oh .......................... H01S 3/302
372/39
6,643,060 B2 * 11/2003 Hashimoto ............. H01S 3/083
359/346

(Continued)

FOREIGN PATENT DOCUMENTS

CN   107834351 A   3/2018
CN   108051890 A   5/2018
(Continued)

OTHER PUBLICATIONS

Search Report dated Feb. 27, 2019, Application No. PCT/CN2018/110443.

(Continued)

*Primary Examiner* — M. A. Golub-Miller
(74) *Attorney, Agent, or Firm* — The Dobrusin Law Firm, PC

(57) ABSTRACT

The present invention discloses a transverse mode switchable all-fiber high-order mode Brillouin laser. The laser comprises a narrow linewidth pump laser, an optical amplifier, a 1×N optical switch (N≥2), a fiber mode selection coupler group, a first polarization controller, a fiber circulator, a fiber coupler, a second polarization controller, and a few-mode fiber. Based on the Brillouin nonlinear gain of a few-mode fiber in a ring cavity, the present invention realizes the resonance amplification of a specific order transverse mode in the cavity, and obtains the transverse mode switchable high-order mode laser beam output. The present invention, adopting an all-fiber structure, has the advantages of simple structure, low cost, easy fiber system
(Continued)

integration, high stability and narrow linewidth of outputted laser beams, etc., and improves the practicality and reliability of high-order mode lasers.

8 Claims, 4 Drawing Sheets

(51) Int. Cl.
  *H01S 3/0804* (2023.01)
  *H01S 3/094* (2006.01)
  *H01S 3/10* (2006.01)
  *H01S 3/08* (2023.01)
  *H01S 3/0941* (2006.01)

(52) U.S. Cl.
  CPC ...... *H01S 3/0804* (2013.01); *H01S 3/094003* (2013.01); *H01S 3/1001* (2019.08); *H01S 3/1003* (2013.01); *H01S 3/08013* (2013.01); *H01S 3/09415* (2013.01); *H01S 3/094065* (2013.01); *H01S 3/10061* (2013.01)

(58) Field of Classification Search
  CPC .. H01S 3/1001; H01S 3/1003; H01S 3/08013; H01S 3/094065; H01S 3/09415; H01S 3/10061
  See application file for complete search history.

(56) References Cited

U.S. PATENT DOCUMENTS

| | | | |
|---|---|---|---|
| 7,272,160 B1* | 9/2007 | Geng | H01S 3/302 |
| | | | 372/29.011 |
| 2017/0302048 A1 | 10/2017 | Li et al. | |
| 2021/0257804 A1* | 8/2021 | Gan | H01S 3/302 |
| 2022/0050012 A1* | 2/2022 | Redding | G01M 11/3127 |
| 2022/0221583 A1* | 7/2022 | Rolland | G01S 7/4917 |

FOREIGN PATENT DOCUMENTS

| | | |
|---|---|---|
| CN | 108551075 A | 9/2018 |
| CN | 109324373 A | 2/2019 |
| CN | 110308516 A | 10/2019 |

OTHER PUBLICATIONS

Heng, Xiaobo et al. "Transverse Mode Switchable All-Fiber Brillouin Laser" Optics Letters, vol. 43, No. (17), Aug. 24, 2018, p. 4172, left-hand column, paragraph 1 to p. 4175, right-hand column, paragraph 2, and figures 1-5.

Chen, Jiali et al. "Refractive Index Fiber Sensor Based on Brillouin Fast Light" Applied Physics Express, vol. 7, Dec. 18, 2013, p. 012501-1, left-hand column, last paragraph, and figure 1.

Ren, Fang et al. "Spatial-Mode Switchable Ring Fiber Laser Based on Low Mode-Crosstalk All-Fiber Mode MUX/DEMUX" Optics and Laser Technology, vol. 101, Nov. 10, 2017, pp. 21-24.

* cited by examiner

TRANSVERSE MODE SWITCHABLE ALL-FIBER HIGH-ORDER MODE BRILLOUIN LASER

FIELD OF THE INVENTION

The present invention relates to the technical field of optical communication, in particular to a transverse mode switchable all-fiber high-order mode Brillouin laser.

BACKGROUND OF THE INVENTION

Fiber lasers, due to their advantages in threshold reduction, system compatibility, wavelength tunability, flexibility, stability and compactness, are new laser technologies that have developed rapidly in recent years. They have extremely broad application prospects in the future high bit rate dense wavelength division multiplexing systems, optical time division multiplexing systems, optical carrier wireless communication systems, high-performance fiber sensor networks, optical measurement, laser processing, laser medical treatment, lidars, and other fields. As an ideal choice for multichannel light sources in wavelength division multiplexing systems and fiber sensing networks, wavelength-tunable fiber lasers and multi-wavelength fiber lasers have attracted much attention. At present, the tunable fiber Bragg grating is commonly used to realize the wavelength-tunable fiber laser. The spacing of the fiber Bragg grating is tuned through mechanical stretching or heating.

With the rapid development of mobile communication services, Internet technologies such as cloud computing, Internet of Things and big data have been rising day by day. It is difficult for current wavelength division multiplexing, polarization multiplexing and other technologies to further increase the information transmission capacity. High-order mode laser beams have attracted more and more attention due to their unique spatial intensity, phase and polarization distribution. With information modulated in several different high-order modes, the resulting mode division multiplexing technology can significantly increase the transmission capacity in optical communication, and has great potential in the field of optical communication. Driven by these application prospects, researchers have proposed many methods to generate high-order mode laser beams. At present, lasers that generate high-order mode laser beams can be roughly divided into two categories: a solid-component solid-state laser and an all-fiber laser. Compared with the former, the all-fiber laser has such advantages as low cost, good flexibility, high stability, small size, and high efficiency. However, when the structure is fixed, the order of the transverse mode outputted by these high-order mode lasers is also fixed, which is not conducive to the development of high-capacity and integrated all-fiber communication systems. Therefore, it is of great significance to achieve a high-efficiency, all-fiber and low-cost method to obtain a transverse mode switchable high-order mode laser with high purity, high stability, and compact structure.

CONTENTS OF THE INVENTION

The object of the present invention is to provide a transverse mode switchable all-fiber high-order mode Brillouin laser. By adjusting the 1×N optical switch, the present invention realizes that the pump light of a specific order transverse mode is injected into the ring cavity; based on the Brillouin non-linear gain of the few-mode fiber in the ring cavity, the present invention realizes the resonance amplification of a specific order transverse mode in the ring cavity, and obtains the transverse mode switchable high-order mode laser beam output.

The object of the present invention can be achieved through the following technical solution:

A transverse mode switchable all-fiber high-order mode Brillouin laser is provided, comprising a narrow linewidth pump laser, an optical amplifier, a 1×N optical switch (N≥2), a fiber mode selection coupler group, a first polarization controller, a fiber circulator, a fiber coupler, a second polarization controller, and a few-mode fiber.

The 1×N optical switch comprises one input port and N output ports;

the fiber mode selection coupler group comprises N fiber mode selection couplers, which are respectively denoted as a first fiber mode selection coupler to an Nth fiber mode selection coupler; each of the N fiber mode selection couplers comprises a first port, a second port, a third port, and a fourth port; the fourth port of the N−1th fiber mode selection coupler is connected to the third port of the Nth fiber mode selection coupler;

the fiber circulator comprises a first port, a second port, and a third port;

the fiber coupler comprises a first port, a second port, a third port, and a fourth port;

the narrow linewidth pump laser is connected to the optical amplifier, which is connected to the input port of the 1×N optical switch; the N output ports of the 1×N optical switch are respectively connected to the first ports of the N fiber mode selection couplers; the fourth port of the Nth fiber mode selection coupler is connected to the first port of the fiber circulator through the first polarization controller; the second port of the fiber circulator is connected to the first port of the fiber coupler; the second port of the fiber coupler is connected to the third port of the fiber circulator through the second polarization controller and the few-mode fiber to form a ring cavity; and the third port of the fiber coupler outputs laser beams.

Preferably, the narrow linewidth pump laser is a power-tunable narrow linewidth semiconductor laser or narrow linewidth fiber laser, wherein the linewidth of the laser is less than 1 MHz.

Preferably, the optical amplifier is a high-gain fiber amplifier or a semiconductor optical amplifier.

Preferably, the 1×N optical switch is a fiber device that can quickly switch on/off optical signals of each output port, or a mechanically and electrically controlled coupling-ratio-tunable fiber coupler.

Preferably, the fiber mode selection coupler is a 2×2 coupler made by fused biconical taper of a single-mode fiber and a few-mode fiber, wherein the coupler can realize directional selection coupling between the fundamental transverse mode in the single-mode fiber and the specific order transverse mode in the few-mode fiber, and wherein the first and second ports of the coupler use the single-mode fiber, and the third and fourth ports use the few-mode fiber.

Preferably, the fiber circulator is a few-mode fiber circulator, and the pigtail fibers of the three ports of the circulator are the few-mode fibers.

Preferably, the fiber coupler is a 2×2 coupler made by fused biconical taper of a few-mode fiber and a few-mode fiber, wherein the coupler can realize directional selection coupling between a specific order transverse mode in the few-mode fiber and the same order transverse mode in the few-mode fiber, and wherein the pigtail fibers of the four ports of the coupler are the few-mode fibers.

Preferably, the few-mode fiber is a kind of fiber which transmits multiple transverse modes in the working-band, the number of transverse modes transmitted by the few-mode fiber is greater than or equal to N, and the length of the few-mode fiber is greater than 20 cm.

The fiber laser of the present invention has a ring cavity structure, wherein the ring cavity contains a fiber circulator and a fiber coupler, and the connecting fiber in the entire ring cavity is a few-mode fiber. By adjusting the 1×N optical switch, the present invention realizes that the pump light of a specific order transverse mode is injected into the ring cavity. The present invention utilizes stimulated Brillouin scattering in the few-mode fiber to realize resonance amplification of the specific order transverse mode in the ring cavity, and generates stable and high-purity transverse mode switchable high-order mode Brillouin laser beams at room temperature.

The present invention has the following beneficial effects relative to the prior art:
1. The present invention uses an optical switch to adjust the pump light mode of the injection laser cavity, thereby realizing the output of laser beams of different order modes, with a fast switching rate, high switching accuracy, and low loss;
2. the present invention uses the fiber mode selection coupler as the mode conversion device outside the laser resonator, and the laser output coupling device, having the advantages of low loss and high efficiency;
3. the present invention realizes high-order mode intra-cavity resonance amplification based on Brillouin nonlinear gain, so the obtained high-order mode laser has the advantage of high-purity;
4. the present invention uses the passive few-mode fiber as the gain medium, which is convenient to obtain and easy to promote;
5. the present invention, adopting an all-fiber structure, has the advantages of simple structure, low cost, easy fiber system integration, high stability and narrow linewidth of outputted laser beams, etc., and improves the practicality and reliability of high-order mode lasers.

In the figure: 1. a narrow linewidth pump laser; 2. an optical amplifier; 3. a 1×N optical switch; 4. a first fiber mode selection coupler; 5. a second fiber mode selection coupler; 6. an Nth fiber mode selection coupler; 7. a first polarization controller; 8. a fiber circulator; 9. a third fiber mode selection coupler; 10. a second polarization controller; and 11. a few-mode fiber.

DETAILED DESCRIPTION OF THE EMBODIMENTS

The present invention will be further described in detail below with reference to examples and drawings, but the embodiments of the present invention are not limited thereto.

Example 1

Figure 1:
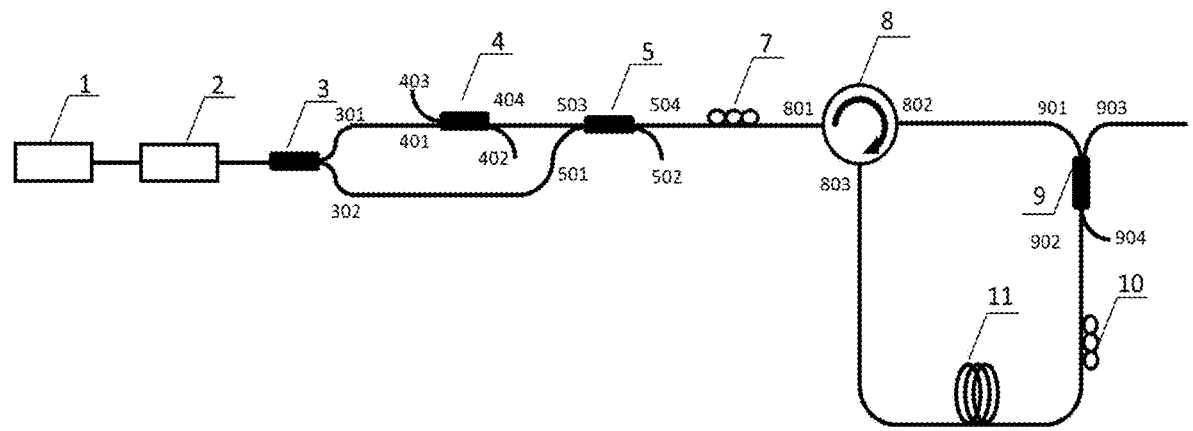
FIG. 1 is a schematic diagram of the all-fiber zero-order and first-order switchable Brillouin lasers in Example 1.

FIG. 1 shows an all-fiber zero-order and first-order switchable Brillouin laser in this example, comprising a narrow linewidth pump laser 1, an optical amplifier 2, a 1×N optical switch (N=2) 3, a first fiber mode selection coupler 4, a second fiber mode selection coupler 5, a first polarization controller 7, a fiber circulator 8, a fiber coupler 9, a second polarization controller 10, and a few-mode fiber 11.

In this example, the narrow linewidth pump laser 1 is a C-band power-tunable narrow linewidth semiconductor laser or narrow linewidth fiber laser, wherein the linewidth of the laser is less than 1 MHz, and the pigtail fiber is a single-mode fiber.

The optical amplifier 2 is a high-gain erbium-doped fiber amplifier or a 1550 nm band semiconductor optical amplifier, wherein the pigtail fiber is a single-mode fiber.

Figure 2:
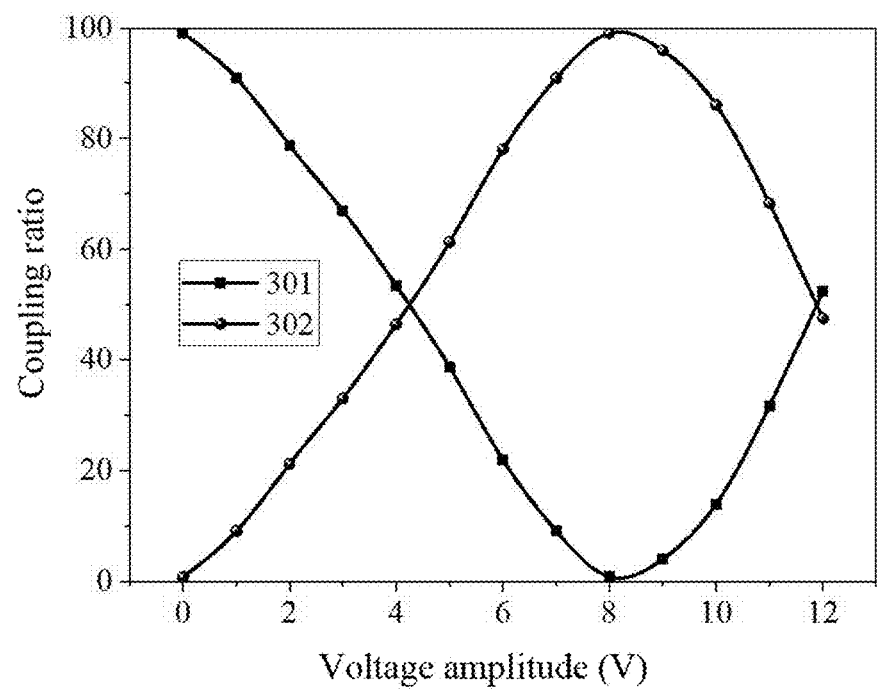
FIG. 2 shows the change of the output coupling ratio of the 1×N optical switch (N=2) with the applied voltage in Example 1.

The 1×N optical switch 3 (N=2) uses a coupling-ratio-tunable fiber coupler, which comprises PZT and a 1×2 coupler made by fused biconical taper of a single-mode fiber and a single-mode fiber, wherein the input end is fixed at one end of the PZT, and the first output port 301 and the second output port 302 are fixed at the other end of the PZT. Through adjustment of the voltage applied to the PZT, the coupling zone is stretched to achieve the tuning of the coupling ratio of the first output port and the second output port. As shown in FIG. 2, when the applied voltage is 0 V, the coupling ratio of the first output port and the second output port is 100:0; when the applied voltage is 8 V, the coupling ratio of the first output port and the second output port is 0:100.

Figure 3:
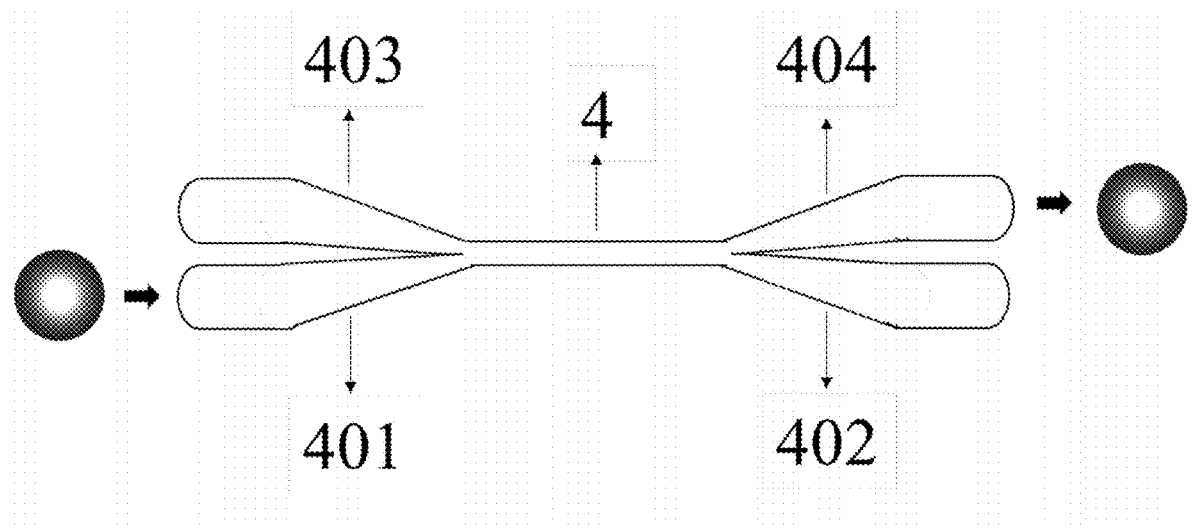
FIG. 3 is a schematic diagram of mode conversion of the first fiber mode selection coupler in Example 1.

The first fiber mode selection coupler 4 uses a 2×2 coupler made by fused biconical taper of a single-mode fiber and a few-mode fiber. The selected coupler, as shown in FIG. 3, can realize directional selection coupling between the fundamental transverse mode in the single-mode fiber and the zero-order fundamental transverse mode in the few-mode fiber, wherein the first port 401 and the second port 402 use the single-mode fiber, and the third port 403 and the fourth port 404 use the few-mode fiber.

Figure 4:
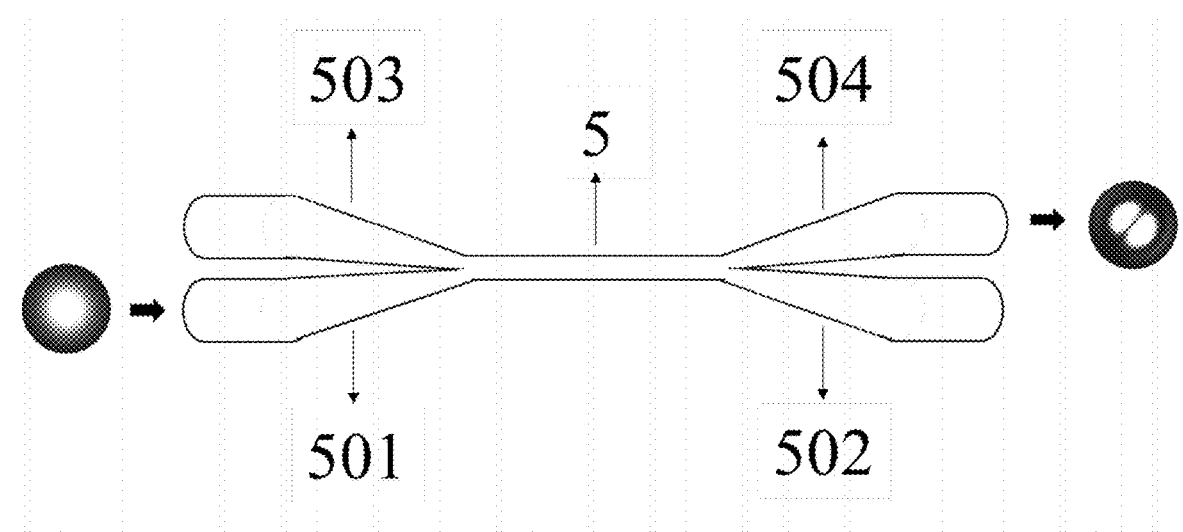
FIG. 4 is a schematic diagram of mode conversion of the second fiber mode selection coupler in Example 1.

The second fiber mode selection coupler 5 uses a 2×2 coupler made by fused biconical taper of a single-mode fiber and a few-mode fiber. The selected coupler, as shown in FIG. 4, can realize directional selection coupling between the fundamental transverse mode in the single-mode fiber and the first-order high-order transverse mode in the few-mode fiber, wherein the first port 501 and the second port 502 use the single-mode fiber, and the third port 503 and the fourth port 504 use the few-mode fiber.

The fiber circulator 8 is a few-mode fiber circulator comprising a first port 801, a second port 802, and a third port 803, wherein the pigtail fibers of the three ports are few-mode fibers.

The fiber coupler 9 uses a 2×2 coupler made by fused biconical taper of a few-mode fiber and a few-mode fiber, and can realize directional selection coupling between a specific order transverse mode in the few-mode fiber and the same order transverse mode in the few-mode fiber, wherein the pigtail fibers of the four ports of the coupler are the few-mode fibers.

The few-mode fiber 11, as an ordinary commercial 1550-band few-mode fiber, supports two modes including the zero-order fundamental transverse mode and the first-order high-order transverse mode, and has a length of 50 M.

Figure 5:
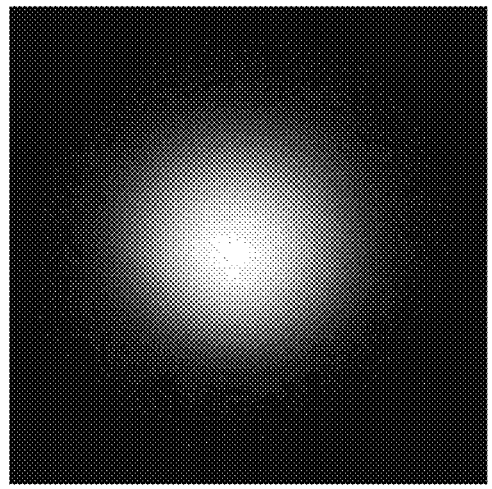
FIG. 5 shows the fundamental transverse mode light spot outputted by the laser in Example 1.

In this example, when the amplitude of the voltage applied to the 1×N optical switch (N=2) is 0 V, the power of the laser beam outputted by the narrow linewidth pump laser is amplified by an amplifier, with the amplified high-power pump light injected into the input port of the 1×N optical switch (N=2); 100% of the pump light is injected into the first port 401 of the first fiber mode selection coupler from the first port 301 of the 1×N optical switch (N=2); after passing through the first fiber mode selection coupler, the pump light changes from the fundamental transverse mode of the single-mode fiber in the first port 401 to the zero-order fundamental transverse mode of the few-mode fiber in the fourth port 404; then the generated zero-order fundamental transverse mode pump light is injected into the third port 503 of the second fiber mode selection coupler; since the phase matching condition is not satisfied, after passing through the second fiber mode selection coupler, the zero-order fundamental transverse mode pump light is still injected into the first port 801 of the fiber circulator through the first polarization controller from the fourth port 504, then into the first port 901 of the fiber coupler from the second port 802 of the fiber circulator, and finally into the few-mode fiber; as a result, the stimulated Brillouin scattering effect occurs, producing zero-order fundamental transverse mode Brillouin Stokes light in reverse operation; when the pump light power exceeds the Brillouin threshold in the ring cavity, the zero-order fundamental transverse mode Brillouin Stokes light generated in the few-mode fiber passes successively through the second port 902 of the fiber coupler, and the second port 802 and third port 803 of the fiber circulator to enter the few-mode fiber again, forming oscillation in the ring cavity, i.e., generating a zero-order fundamental transverse mode Brillouin Stokes laser beam with the pump light frequency shifted down by one order; the zero-order fundamental transverse mode Brillouin Stokes laser beam is outputted through the third port 903 of the fiber coupler to obtain a zero-order fundamental transverse mode laser beam, as shown in FIG. 5. The first polarization controller between the fourth port 504 of the second fiber mode selection coupler and the first port 801 of the fiber circulator and the second polarization controller on the few-mode fiber jointly control the polarization state of the pump light and the Brillouin pump light to obtain the maximum Brillouin nonlinear gain.

Figure 6:
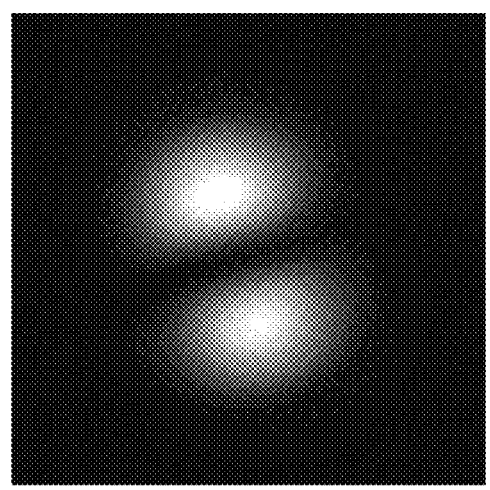
FIG. 6 shows the first-order mode light spot outputted by the laser in Example 1.

When the amplitude of the voltage applied to the 1×N optical switch (N=2) is 8 V, the power of the laser beam outputted by the narrow linewidth pump laser is amplified by an amplifier, with the amplified high-power pump light injected into the input port of the 1×N optical switch (N=2); 100% of the pump light is injected into the first port 501 of the second fiber mode selection coupler from the second port 302 of the 1×N optical switch (N=2); after passing through the second fiber mode selection coupler, the pump light changes from the fundamental transverse mode of the single-mode fiber in the first port 501 to the first-order high-order transverse mode of the few-mode fiber in the fourth port 504; the generated first-order high-order transverse mode pump light is injected into the first port 801 of the fiber circulator through the first polarization controller, then into the first port 901 of the fiber coupler from the second port 802 of the fiber circulator, and finally into the few-mode fiber; as a result, the stimulated Brillouin scattering effect occurs, producing first-order high-order transverse mode Brillouin Stokes light in reverse operation; when the pump light power exceeds the Brillouin threshold in the ring cavity, the first-order high-order transverse mode Brillouin Stokes light generated in the few-mode fiber passes successively through the second port 902 of the fiber coupler, and the second port 802 and third port 803 of the fiber circulator to enter the few-mode fiber again, forming oscillation in the ring cavity, i.e., generating a first-order high-order transverse mode Brillouin Stokes laser beam with the pump light frequency shifted down by one order; the first-order high-order transverse mode Brillouin Stokes laser beam is outputted through the third port 903 of the fiber coupler to obtain a first-order high-order mode laser beam, as shown in FIG. 6. The first polarization controller between the fourth port 504 of the second fiber mode selection coupler and the first port 801 of the fiber circulator and the second polarization controller on the few-mode fiber jointly control the polarization state of the pump light and the Brillouin pump light to obtain the maximum Brillouin nonlinear gain.

By adjusting the voltage applied to the PZT in the 1×N optical switch (N=2), the optical signal switching between the first port 301 and the second port 302 is realized, so that the pump light of a specific order transverse mode is injected into the ring cavity. The connecting fiber in the ring cavity is a few-mode fiber, and operates in a specific order transverse mode; based on the Brillouin nonlinear effect, the resonance amplification of the specific order transverse mode in the cavity is realized, so that the laser beam of the specific order transverse mode of high mode purity is obtained at the third port 903 of the fiber coupler.

Example 2

Figure 7:
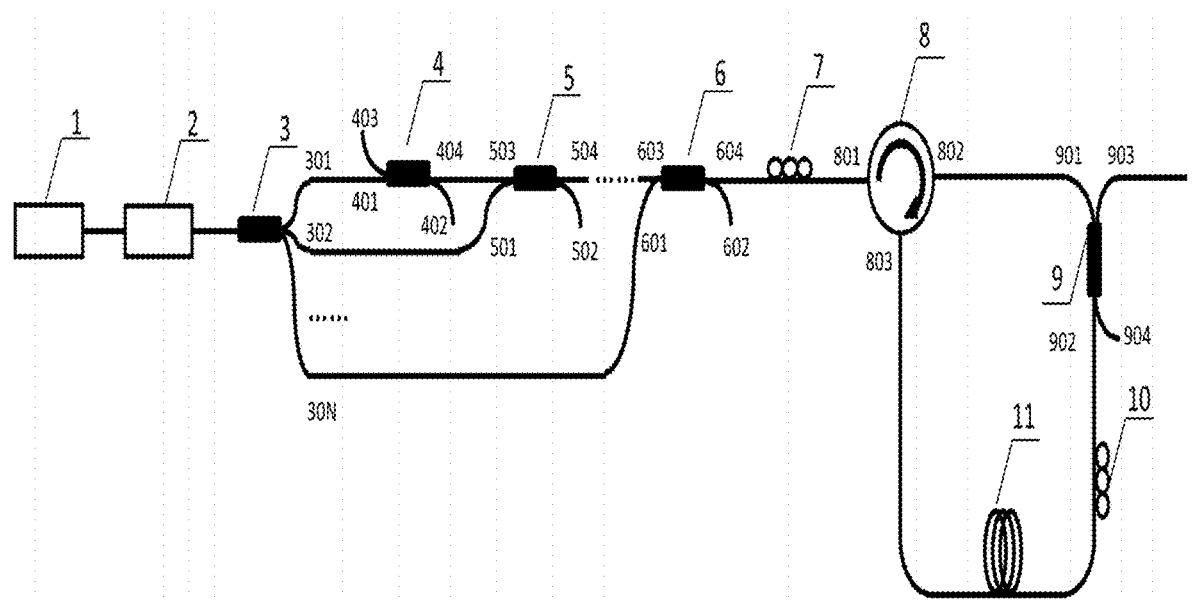
FIG. 7 is a schematic diagram of the transverse mode switchable all-fiber high-order mode Brillouin laser in Example 2.

A transverse mode switchable all-fiber high-order mode Brillouin laser, as shown in FIG. 7, comprises a narrow linewidth pump laser 1, an optical amplifier 2, a 1×N optical switch (N>2) 3, a fiber mode selection coupler group, a first polarization controller 7, a fiber circulator 8, a fiber coupler 9, a second polarization controller 10, and a few-mode fiber 11.

The 1×N optical switch 3 comprises one input port and N output ports 301-30N;

the fiber mode selection coupler group comprises N fiber mode selection couplers, which are respectively denoted as a first fiber mode selection coupler 4, a second fiber mode selection coupler 5 to an Nth fiber mode selection coupler 6; each of the N fiber mode selection couplers comprises a first port, a second port, a third port, and a fourth port; the fourth port of the N−1th fiber mode selection coupler is connected to the third port of the Nth fiber mode selection coupler;

the fiber circulator 8 comprises a first port 801, a second port 802 and a third port 803;

the fiber coupler 9 comprises a first port 901, a second port 902, a third port 903 and a fourth port 904;

the narrow linewidth pump laser is connected to the optical amplifier, which is connected to the input port of the 1×N optical switch (N>2); the N output ports of the 1×N optical switch are respectively connected to the first ports of the N fiber mode selection couplers; the fourth port of the Nth fiber mode selection coupler is connected to the first port of the fiber circulator through the first polarization controller; the second port of the fiber circulator is connected to the first port of the fiber coupler; the second port of the fiber coupler is connected to the third port of the fiber circulator through the second polarization controller and the few-mode fiber to form a ring cavity; and the third port of the fiber coupler outputs laser beams.

The above-described examples are preferred embodiments of the present invention, but the embodiments of the present invention are not limited thereto, and any other alterations, modifications, replacements, combinations and simplifications should be equivalent substitutions and included in the scope of protection of the present invention.

The invention claimed is:

1. A transverse mode switchable all-fiber high-order mode Brillouin laser, characterized in that: the laser comprises a narrow linewidth pump laser, an optical amplifier, a 1×N optical switch (N≥2), a fiber mode selection coupler group, a first polarization controller, a fiber circulator, a fiber coupler, a second polarization controller, and a few-mode fiber;

the 1×N optical switch comprises one input port and N output ports;

the fiber mode selection coupler group comprises N fiber mode selection couplers, which are respectively denoted as a first fiber mode selection coupler to an Nth fiber mode selection coupler; each of the N fiber mode selection couplers comprises a first port, a second port, a third port, and a fourth port; the fourth port of the N−1th fiber mode selection coupler is connected to the third port of the Nth fiber mode selection coupler;

the fiber circulator comprises a first port, a second port, and a third port;

the fiber coupler comprises a first port, a second port, a third port, and a fourth port;

the narrow linewidth pump laser is connected to the optical amplifier, which is connected to the input port of the 1×N optical switch; the N output ports of the 1×N optical switch are respectively connected to the first ports of the N fiber mode selection couplers; the fourth port of the Nth fiber mode selection coupler is connected to the first port of the fiber circulator through the first polarization controller; the second port of the fiber circulator is connected to the first port of the fiber coupler; the second port of the fiber coupler is connected to the third port of the fiber circulator through the second polarization controller and the few-mode fiber to form a ring cavity; and the third port of the fiber coupler outputs laser beams.

2. The transverse mode switchable all-fiber high-order mode Brillouin laser according to claim 1, characterized in that: the narrow linewidth pump laser is a power-tunable narrow linewidth semiconductor laser or narrow linewidth fiber laser, wherein the linewidth of the laser is less than 1 MHz.

3. The transverse mode switchable all-fiber high-order mode Brillouin laser according to claim 1, characterized in that: the optical amplifier is a high-gain fiber amplifier or a semiconductor optical amplifier.

4. The transverse mode switchable all-fiber high-order mode Brillouin laser according to claim 1, characterized in that: the 1×N optical switch is a fiber device that can quickly switch on/off optical signals of each output port, or a mechanically and electrically controlled coupling-ratio-tunable fiber coupler.

5. The transverse mode switchable all-fiber high-order mode Brillouin laser according to claim 1, characterized in that: the fiber mode selection coupler is a 2×2 coupler made by fused biconical taper of a single-mode fiber and a few-mode fiber, wherein the first and second ports of the coupler use the single-mode fiber, and the third and fourth ports use the few-mode fiber.

6. The transverse mode switchable all-fiber high-order mode Brillouin laser according to claim 1, characterized in that: the fiber circulator is a few-mode fiber circulator, and pigtail fibers of the three ports of the circulator are the few-mode fibers.

7. The transverse mode switchable all-fiber high-order mode Brillouin laser according to claim 1, characterized in that: the fiber coupler is a 2×2 coupler made by fused biconical taper of the few-mode fiber and the few-mode fiber, and the pigtail fibers of the four ports of the coupler are the few-mode fibers.

8. The transverse mode switchable all-fiber high-order mode Brillouin laser according to claim 1, characterized in that: the few-mode fiber is a kind of fiber which transmits multiple transverse modes in the working-band, the number of transverse modes transmitted by the few-mode fiber is greater than or equal to N, and the length of the few-mode fiber is greater than 20 cm.

* * * * *